Aug. 6, 1957 M. DECKER 2,801,611
BIRD FEEDER AND CAROUSEL
Filed April 9, 1957

INVENTOR.
MAE DECKER
BY
J. Ledermann
ATTORNEY

United States Patent Office 2,801,611
Patented Aug. 6, 1957

2,801,611
BIRD FEEDER AND CAROUSEL
Mae Decker, Ulster Park, N. Y.

Application April 9, 1957, Serial No. 651,741

8 Claims. (Cl. 119—51)

This invention relates to bird feeders and, more particularly, to bird feeders which are movable.

One object of the present invention is the provision of a bird feeder which by virtue of its constant movement, especially when the movement is enhanced by the alighting or taking off of birds, particularly small birds such as, for example, chickadees, affords a constant and interesting entertainment to persons watching the feeder.

Another object of the invention is the provision of an elongated trough-like bird feeder suspended from a swivel which is adapted to be hung from a tree limb or branch, so that when a bird alights or takes off therefrom, especially in the latter case, the feeder is given a push which tends to turn it on its pivot and thus cause it to rotate. It has been found by experience that birds both alight and take off from the rotating feeder.

A still further object of the invention is the provision on the ends of the feeder of wing-like extensions lying parallel with each other but extending in transversely opposite directions, and adapted themselves to constitute ornaments or to have ornamental configurations or to have ornamental designs applied thereto. These extensions also serve as wind vanes whereby, when there is a breeze, the feeder tends to rotate constantly in one direction.

Still another object of the invention is the provision of a bird feeder and carousel possessing the above-mentioned characteristics, which is at the same time simple and inexpensive to manufacture and is well adapted for mass production.

All of the foregoing as well as additional objects and advantages of the invention will become apparent in the following description, taken in connection with the accompanying drawing wherein.

Figure 1:
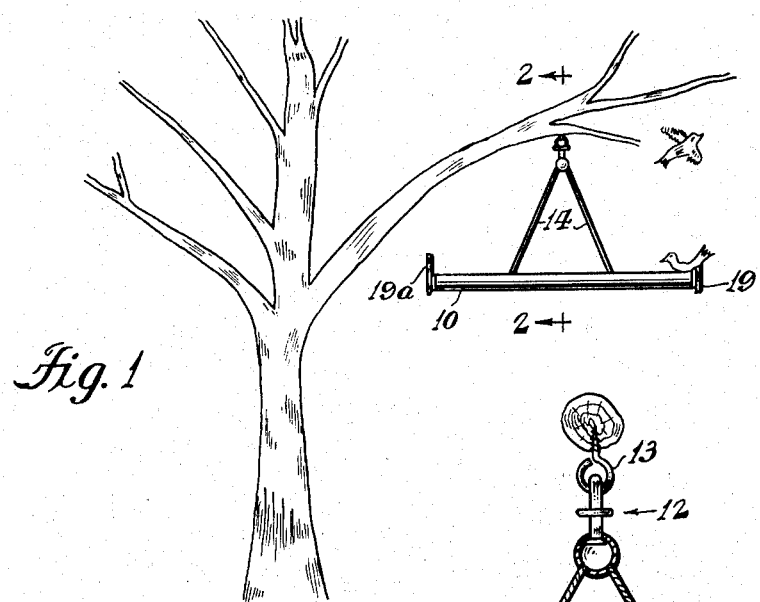
Fig. 1 is a side elevational view of the bird feeder and carousel of the present invention, showing the same suspended from a tree limb.
Figure 2:
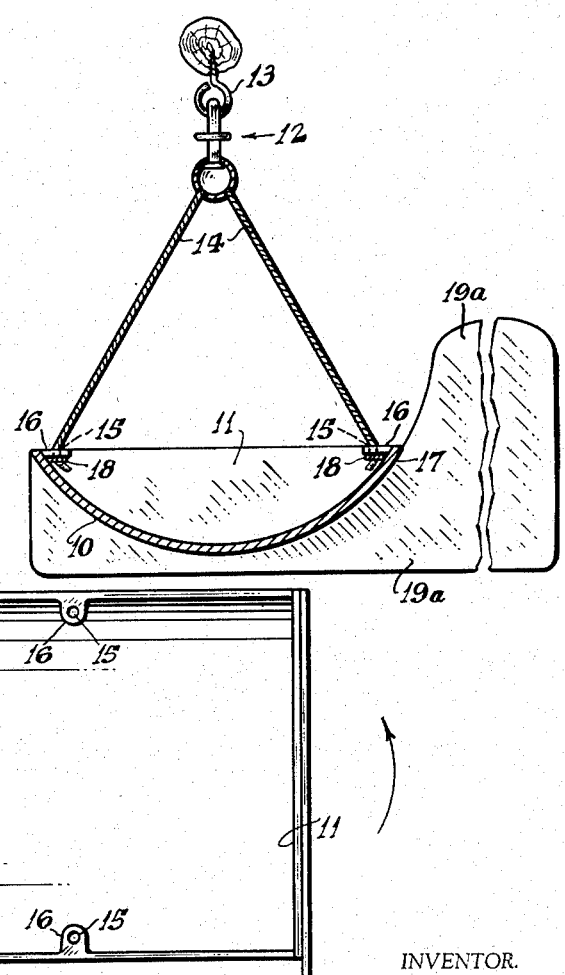
Fig. 2 is an enlarged sectional view taken on the line 2—2 of Fig. 1.

Referring in detail to the drawing, the numeral 10 indicates the feeder trough which is preferably approximately semi-cylindrical in cross-section and has upright end walls 11. A swivel 12, adapted to be suspended by a hook or the like 13 from a limb or branch of a tree, has depending therefrom four equal lengths of cord or the like 14 each of which has its lower end anchored in an opening 15 preferably provided on a horizontal tab 16 formed integrally with the trough side walls 17. These tabs and openings are positioned equidistant from the center point of the trough, and this center point is in vertical alignment of the axis of the swivel 12 when the feeder is at rest. The lower ends of the cords 14 may be anchored in the tabs 16 by any suitable means such as, for example, by knots 18.

Figure 3:
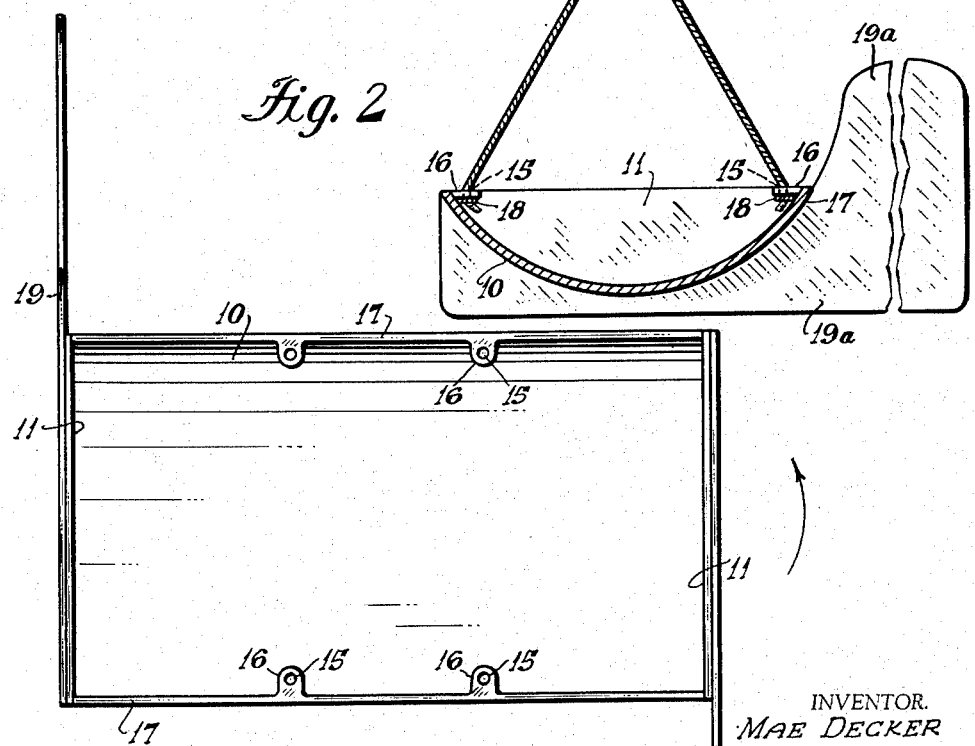
Fig. 3 is a plan view of the feeder trough per se.

In order to encourage or cause rotation of the trough about its axis when there is a breeze, the end walls 11 are provided with transverse (with respect to the trough) wings or the like 19 extending in opposite directions, as illustrated in Fig. 3, so that the wings tend to rotate the feeder in the direction of the arrow. These wings may be secured against the end walls 11 in any desired manner, as shown, or they may be made integral with the end walls 11, not shown; they preferably extend downward below the bottom of the trough 10, and the portions 19a thereof which extend transversely from the trough may be provided with an ornamental configuration or have an ornamental representation thereon, the particular conformation thereof being immaterial.

The entire feeder including the trough 10 and its end walls 11 and wing extensions 19 may of course be made of any desired material, but the material should preferably be of light weight and resistant to corrosion.

It is apparent from the foregoing description that the bird feeder and carousel herein disclosed serves to attain the objects set forth above. Normally, when there is a breeze blowing, the feeder will tend to rotate on its axis in the direction indicated by the arrow in Fig. 3. When a bird alights on the feeder, which in most cases would occur at a point spaced from the transverse median line of the trough, its weight, although very slight, will have an effect on the rotation of the feeder, and the weight of one or more birds thereon will also affect its motion in a vertical plane. When a bird takes off from the feeder its effect upon the motion thereof is greater than when it alights, owing to the principle of reaction being equal to action, so that the trough is given a push which further alters its motion. In any event, the feeder tends to rotate about its pivot axis with varying effects upon its vertical movement, so that it generally gives the effect of a carousel in motion.

While the invention has been described with particular reference to the construction shown in the drawing, it is to be understood that such is not to be construed as imparting limitations upon the invention, which is best defined in the claims appended hereto.

Having thus described my invention, what I claim as new and desire to secure by Letters Patent is as follows:

1. A bird feeder and carousel comprising an elongated hollow trough-shaped member having parallel side edges and substantially vertical end walls, a swivel having means for suspending one end thereof from a support, four suspension members secured by their upper ends to the other end of the swivel, the lower ends of two of said suspension members being secured to one of said side edges at points equidistant from the transverse median line of said first-named member, the lower ends of the other two of said suspension members being secured to the other of said side edges at points equidistant from said median line.

2. A bird feeder and carousel according to claim 1, having wing extensions extending from said end walls at right angles to said edges and in opposite directions with respect to the longitudinal median line of said first-named member.

3. A bird feeder and carousel according to claim 1, said suspension members comprising flexible cords.

4. A bird feeder and carousel according to claim 1, said suspension members comprising flexible cords, and means for securing said lower ends of the suspension members as aforesaid comprising tabs on said edges having openings therein, the lower ends of the cords extending through said openings and having their extremities enlarged to a size larger than that of said openings.

5. A bird feeder according to claim 4, said tabs lying in a common plane.

6. A bird feeder according to claim 4, said tabs lying in a common plane and extending inward with respect to said first-named member.

7. A bird feeder according to claim 4, said tabs lying in a common plane and extending inward with respect to said first-named member, the feeder having wing extensions extending from said end walls at substantially right angles to said edges and in opposite directions with respect to the longitudinal median line of said first-named member.

8. A bird feeder according to claim 7, said wing extensions having a depth larger than the depth of said first-named member so that the lower edge thereof projects below the bottom of said first-named member.

No references cited.